US012659750B2

(12) United States Patent
Russell

(10) Patent No.: US 12,659,750 B2
(45) Date of Patent: Jun. 16, 2026

(54) ULTRA-WIDEBAND UNLOCK DEVICE

(71) Applicant: MOTOROLA MOBILITY LLC,
Wilmington, DE (US)

(72) Inventor: Michael E Russell, Lake Zurich, IL
(US)

(73) Assignee: Motorola Mobility LLC, Chicago, IL
(US)

(*) Notice: Subject to any disclaimer, the term of this
patent is extended or adjusted under 35
U.S.C. 154(b) by 589 days.

(21) Appl. No.: 18/047,022

(22) Filed: Oct. 17, 2022

(65) Prior Publication Data

US 2024/0129726 A1 Apr. 18, 2024

(51) Int. Cl.
*H04W 12/63* (2021.01)
*H04L 9/32* (2006.01)
*H04W 12/06* (2021.01)
*H04W 12/08* (2021.01)

(52) U.S. Cl.
CPC ............. *H04W 12/63* (2021.01); *H04L 9/321*
(2013.01); *H04W 12/06* (2013.01); *H04W
12/08* (2013.01)

(58) Field of Classification Search
CPC ... H04W 12/06; H04W 12/069; H04W 12/08;
H04W 12/63; H04W 12/60; H04L 9/321;
G07C 9/00309; G07C 9/28
See application file for complete search history.

(56) References Cited

U.S. PATENT DOCUMENTS

| | | | | |
|---|---|---|---|---|
| 10,438,029 B2 * | 10/2019 | Al-Kadi | ................... | H04B 5/77 |
| 11,252,142 B2 * | 2/2022 | Lakhani | .............. | H04W 12/065 |
| 11,334,138 B1 * | 5/2022 | Mese | ...................... | G06F 21/35 |
| 11,399,372 B2 * | 7/2022 | Jang | .................. | H04M 1/72454 |
| 11,400,889 B2 * | 8/2022 | Parthasarathi | .......... | G01S 11/04 |
| 11,430,274 B1 * | 8/2022 | Jakes | ...................... | G06F 21/88 |
| 11,663,864 B2 * | 5/2023 | Kincaid | ................ | H04W 76/27 |
| | | | | 340/5.31 |
| 11,765,588 B2 * | 9/2023 | Pirch | .................. | G07C 9/00182 |
| 11,837,038 B2 * | 12/2023 | McLachlan | ......... | G06F 3/04817 |
| 11,961,344 B2 * | 4/2024 | Kincaid | ............. | G07C 9/00309 |
| 11,995,496 B1 * | 5/2024 | Mars | ....................... | H04W 4/80 |
| 2019/0066422 A1 * | 2/2019 | Breer | ..................... | H04W 4/20 |
| 2024/0067125 A1 * | 2/2024 | Robertson | .............. | B60R 25/24 |

* cited by examiner

*Primary Examiner* — Zachary A. Davis
(74) *Attorney, Agent, or Firm* — Isidore PLLC

(57) ABSTRACT

A device, method and computer program product enable an
automatic locking/unlocking of a user device such as a
computer workstation or laptop based on accurate location
and authentication of wearable device. A device interface of
the device couples to a second device that has a locked state
configurable to an unlocked state by the device. The device
receives, via an antenna assembly and an UWB transceiver,
UWB signals from a third device, the antenna assembly
comprising two or more antennas spaced in a support
structure as one of a two-dimensional (2D) or a three-
dimensional (3D) antenna array. The device determines a
location of the third device based on a range and an angle of
arrival of the received UWB signals. In response to deter-
mining that the location is within an unlock space of the
second device, the device communicates an unlock com-
mand to the second device.

20 Claims, 7 Drawing Sheets

Range: 45cm
Azimuth Angle: +25°
Elevation Angle: +6°
Line of Sight: NO
Outcome: LOCK Range: 110cm
Azimuth Angle: +45°
Elevation Angle: +10°
Line of Sight: Yes
Outcome: LOCK Range: 55cm
Azimuth Angle: +15°
Elevation Angle: +7°
Line of Sight: Yes
Outcome: UNLOCK

ULTRA-WIDEBAND UNLOCK DEVICE

1. TECHNICAL FIELD

The present disclosure relates generally to an electronic device that unlocks a user interface, and more particularly to an electronic device that automatically unlocks the user interface.

2. DESCRIPTION OF THE RELATED ART

Electronic devices such as desktop workstations, laptops, and management consoles enable users to access proprietary and personal information. To safeguard the information, many electronic devices incorporate locking and unlocking capabilities to prevent an unauthorized person from gaining access when an authorized person leaves the electronic device. In an example, a user interface of the electronic device may have a setting for automatically locking due to lack of activity for a preset period of time. The authorized person may access the user interface if the preset period of time has not elapsed. In another example, the authorized person may have to manually lock and unlock the electronic device, such as by entering particular user inputs or by using an authentication token, e.g., by using a common access card. However, the authorized person may forget to do the manual steps required to lock the electronic device before leaving, leaving the device open to access by an unauthorized person.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
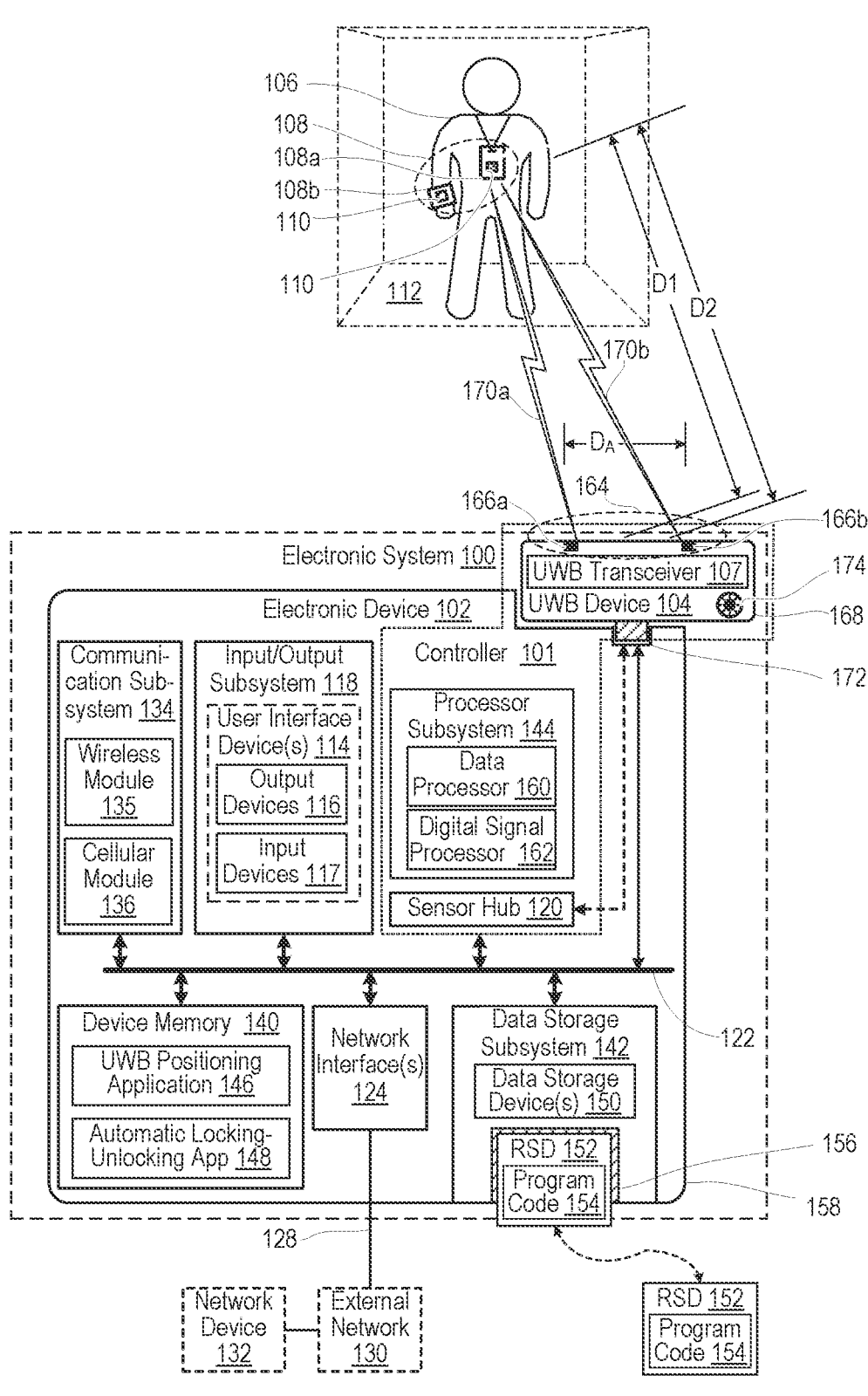
FIG. 1 depicts a functional block diagram of an electronic system having ultra-wideband (UWB) positioning features used to automatically unlock an electronic device, according to one or more embodiments.

According to one or more aspects of the present disclosure, a device, method and computer program product provide unlocking of a user interface of a device in response to accurately locating an authorized user who wears or carries an ultra-wideband (UWB) capable target device. In one or more embodiments, a device includes an antenna assembly having two or more antennas, each spaced in a support structure of an accessory housing as one of a two-dimensional (2D) or a three-dimensional (3D) antenna array. The device includes an UWB transceiver communicatively coupled to the antenna assembly. The device includes a device interface by which the device communicatively couples to a second device. The second device has a locked state that is configurable to an unlocked state by the device. A controller of the device is communicatively coupled to the antenna assembly, the UWB transceiver and the device interface. The controller receives, via the UWB transceiver, UWB signals from a third device. The controller determines a location of the third device based on a range and an angle of arrival of the received UWB signals. In response to determining that the location is within an unlock space of the second device, the controller communicate, via the device interface, an unlock command to the second device to transition the second device from the locked state to the unlocked state.

In an attempt to address these deficiencies, automatic locking and unlocking has been implemented using a radio frequency (RF) communication device such as a Bluetooth device or wireless device. In an example, the authorized user carries a wireless/Bluetooth capable smartphone or smartwatch. Using RF transceivers that are designed for wireless or Bluetooth communication limits location finding of a person who wears or carries the wireless/Bluetooth device. The RF signals can be attenuated by the body of the person. The frequencies and waveforms of these communication protocols do not support location finding with enough accuracy to correctly determine when the authorized user is within an unlock space.

Ultra-wideband (UWB) is a radio technology that can use a very low energy level for short-range, high-bandwidth communications over a large portion of the radio spectrum. UWB has traditional applications in non-cooperative radar imaging. Most recent applications target sensor data collection, precise locating, and tracking. Ultra-wideband is a technology for transmitting information across a wide bandwidth (>500 MHz). This allows for the transmission of a large amount of signal energy without interfering with conventional narrowband and carrier wave transmission in the same frequency band. Regulatory limits in many countries allow for this efficient use of radio bandwidth and enable high-data-rate personal area network (PAN) wireless connectivity, longer-range low-data-rate applications, and the transparent co-existence of radar and imaging systems with existing communications systems.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic system in an operating environment within which the features of the present disclosure are advantageously implemented. In particular, electronic system 100 includes an electronic device 102, which lacks UWB positioning capability. Electronic device 102 may be one of a host of different types of devices, including but not limited to, a computer terminal, a computer workstation, a laptop, a netbook, an ultra-book and/or a tablet computing device or similar device. Electronic device 102 is augmented by UWB device 104 having UWB transceiver 107 that can indirectly locate authorized user 106 who wears or carries UWB capable target device 108. In an example, target device 108 may be badge 108a or smartwatch 108b that each includes UWB transceiver 110. UWB device 104 includes a UWB positioning capability to determine a position of the target device 108 in relation to unlock space 112. In one or more embodiments, unlock space 112 is a two dimensional or three-dimensional space defined relative to a position of UWB device 104. In response to detecting a location of authorized user 106 being within unlock space 112, controller 101 of electronic system 100 can automatically unlock user interface device(s) 114 of electronic device 102. User interface device(s) 114, including includes output device(s) 116 and input device(s) 117, are at least a part of input/output subsystem 118 of electronic device 102.

Electronic device 102 can be a standalone device without communication capabilities. UWB device 104 may be directly communicatively coupled to electronic device 102 such as via sensor hub 120 or system interlink 122. Alternatively, electronic device 102 may include network interface(s) 124 that connects via network connection/cable 128 and external network 130 to network device(s) 132, such as UWB device 104. Alternatively, or in addition, electronic device 102 may include communication subsystem 134 having wireless module 135 and/or cellular module 136 to respectively provide wireless and cellular communication functionality to communicate with UWB device 104.

Controller 101 may include or consist essentially of processor subsystem 144 and may further include sensor hub 120. In addition to I/O subsystem 118, network interface(s) 124 and communication subsystem 134, electronic device 102 further includes device memory 140 and data storage subsystem 142 that are each managed by controller 101. Device memory 140 stores program code for applications, such as UWB positioning application 146, automatic locking-unlocking application 148, and other application(s). Device memory 140 further includes an operating system (OS), a firmware interface, such as basic input/output system (BIOS) or Uniform Extensible Firmware Interface (UEFI), and firmware.

Data storage subsystem 142 of electronic device 102 includes data storage device(s) 150. Controller 101 is communicatively connected, via system interlink 122, to data storage device(s) 150. Data storage subsystem 142 provides applications, program code, and stored data on nonvolatile storage that is accessible by controller 101. For example, data storage subsystem 142 can provide a selection of applications and computer data such as UWB positioning application 146 and automatic locking-unlocking application 148 that are loaded into device memory 140 for execution by controller 101. In one or more embodiments, data storage device(s) can include hard disk drives (HDDs), optical disk drives, and/or solid-state drives (SSDs), etc. Data storage subsystem 142 of electronic device 102 can include one or more non-transitory computer readable storage devices or computer readable storage devices, such as removable storage device (RSD) 152, that contains program code 154 and that is received in RSD interface 156. Controller 101 is communicatively connected to RSD 152, via system interlink 122 and RSD interface 156. Controller 101 can access RSD 152 to provision electronic device 102 with program code 154, such as code for UWB positioning application 146 and related computer data, that when executed by controller 101, configures electronic system 100 to perform several of the functionality described herein.

I/O subsystem 118 includes user interface components such as a display device that presents a user interface. I/O subsystem 118 may include acceleration/movement sensor (s), vibration output device, light output device, image capturing device(s), microphone(s), touch/haptic controls, and audio output device(s). I/O subsystem 118 also may include an I/O controller. The I/O controller provides communication and power signals to functional components described herein as part of communication subsystem 134, device memory 140, I/O subsystem 118, or data storage subsystem 142. The I/O controller connects via a system bus/interconnect to internal devices, which are internal to housing 158, and via an electrical cable to tethered peripheral devices, which are external to housing 158 of electronic device 102. Internal devices can include computing, storage, communication, or sensing components depicted within housing 158. The I/O controller supports the necessary configuration of connectors, electrical power, communication protocols, and data buffering to act as an interface between internal devices and peripheral devices tethered by the electrical cable and other components of electronic device 102 that use a different configuration for inputs and outputs.

Network interface(s) 124 can include a network interface controller (NIC) with a network connection/cable 128 connection to external network 130. Network connection/cable 128 may include wireless and/or wired links. Network interface(s) 124 support one or more network communication protocols. External network 130 can be a local area network (LAN), a campus area network (CAN), a metropolitan area network (MAN), or a wide area network (WAN). For example, network connection/cable 128 can be an Ethernet connection/cable.

Controller 101 manages, and in some instances directly controls, the various functions and/or operations of electronic device 102. These functions and/or operations include, but are not limited to including, application data processing, communication with second communication devices, navigation tasks, image processing, and signal processing. In one or more alternate embodiments, electronic device 102 may use hardware component equivalents for application data processing and signal processing. For example, electronic device 102 may use special purpose hardware, dedicated processors, general purpose computers, microprocessor-based computers, micro-controllers, optical computers, analog computers, dedicated processors and/or dedicated hard-wired logic.

Controller 101 includes processor subsystem 144, which includes one or more central processing units (CPUs), depicted as data processor 160. Processor subsystem 144 can include one or more digital signal processors 162 that are integrated with data processor 160. Processor subsystem 144 can include other processors that are communicatively coupled to data processor 160, such as sensor hub 120. Data processor 160 is communicatively coupled, via system interlink 122, to device memory 140. In one or more embodiments, data processor 160 is communicatively coupled via system interlink 122 to communication subsystem 134, I/O subsystem 118, and data storage subsystem 142.

System interlink 122 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 122) are illustrated in FIG. 1, it is to be understood that more, fewer, or different interconnections may be present in other embodiments.

In one or more embodiments, UWB device 104 can include components and functionality similar to or identical to electronic device 102. In one or more embodiments, a processor subsystem 144 of UWB device 104 may autonomously perform UWB positioning of UWB target device 108. In one or more embodiments, UWB transceiver 107 of UWB device 104 is supervised or directly controlled by controller 101 of electronic device 102. According to one or more aspects of the present disclosure, UWB device 104 includes antenna assembly 164 including two or more antennas 166a-166b, spaced by distance "$D_A$" in support structure 168 ("accessory housing") as one of a two-dimensional (2D) or a three-dimensional (3D) antenna array. Each antenna 166a-166b may be an antenna module of closely positioned antenna elements or be a single antenna.

In an example, controller 101 of UWB device 104 ("first device") is communicatively coupled to electronic device 102 ("second device") by wired connection 172. The electronic device 102 has a locked state that is configurable to an unlocked state by the UWB device 104. Controller 101 is also communicatively coupled to antenna assembly 164 and UWB transceiver 107. Controller 101 receives, via UWB transceiver 107, UWB signals 170a-170b from target device 108. Target device 108 may be at any angle and range to a plane of antenna assembly 164, creating respective distance "D1" and "D2" to each antennas 166a-166b. Antennas 166a-166b and UWB transceiver 107 of UWB device 104 receive first and second UWB signals 170a-170b, which originate as the same UWB signal transmitted by UWB transceiver 110 of target device 108. Controller 101 determines a location of target device 108 device based on a range and an angle of arrival of the received UWB signals 170a-170b. In an example, controller 101 of UWB device 104 determines the distances D1 and D2 based on Time of Flight (TOF) or Time of Arrival/Time-Difference-of-Arrival (TOA/TDOA) methods of first and second UWB signals 170a-170b received respectively by antennas 166a-166b. The difference between D1 and D2 indicates the angle of target device 108 to the plane of antenna assembly 164. In response to determining that the location is within unlock space 112, controller 101 communicates, via a device interface, an unlock command to electronic device 102 to transition electronic device 102 from the locked state to the unlocked state. In one or more embodiments, the device interface includes one or more of a wired connection, a wireless connection, and a cellular connection.

In addition, controller 101 is communicatively coupled to indicator 174, which is externally visible on support structure 168 of UWB device 104 to indicate whether target device 108 is determined to be in unlocking space 112. In one or more embodiments, indicator 174 may have more than an ON and OFF indication to provide additional information. In an example, indicator 174 may be illuminated in one of several colors or blinking patterns when activated and not be illuminated when deactivated. One unique color or blinking pattern may be assigned to one or more of the following conditions when activated: (i) not communicatively connected to an electronic device; (ii) no target devices detected; (iii) an unauthorized target device detected; (iv) an authorized target device detected outside of the unlock space; and (v) an authorized target device detected inside of the unlock space.

Figure 2:
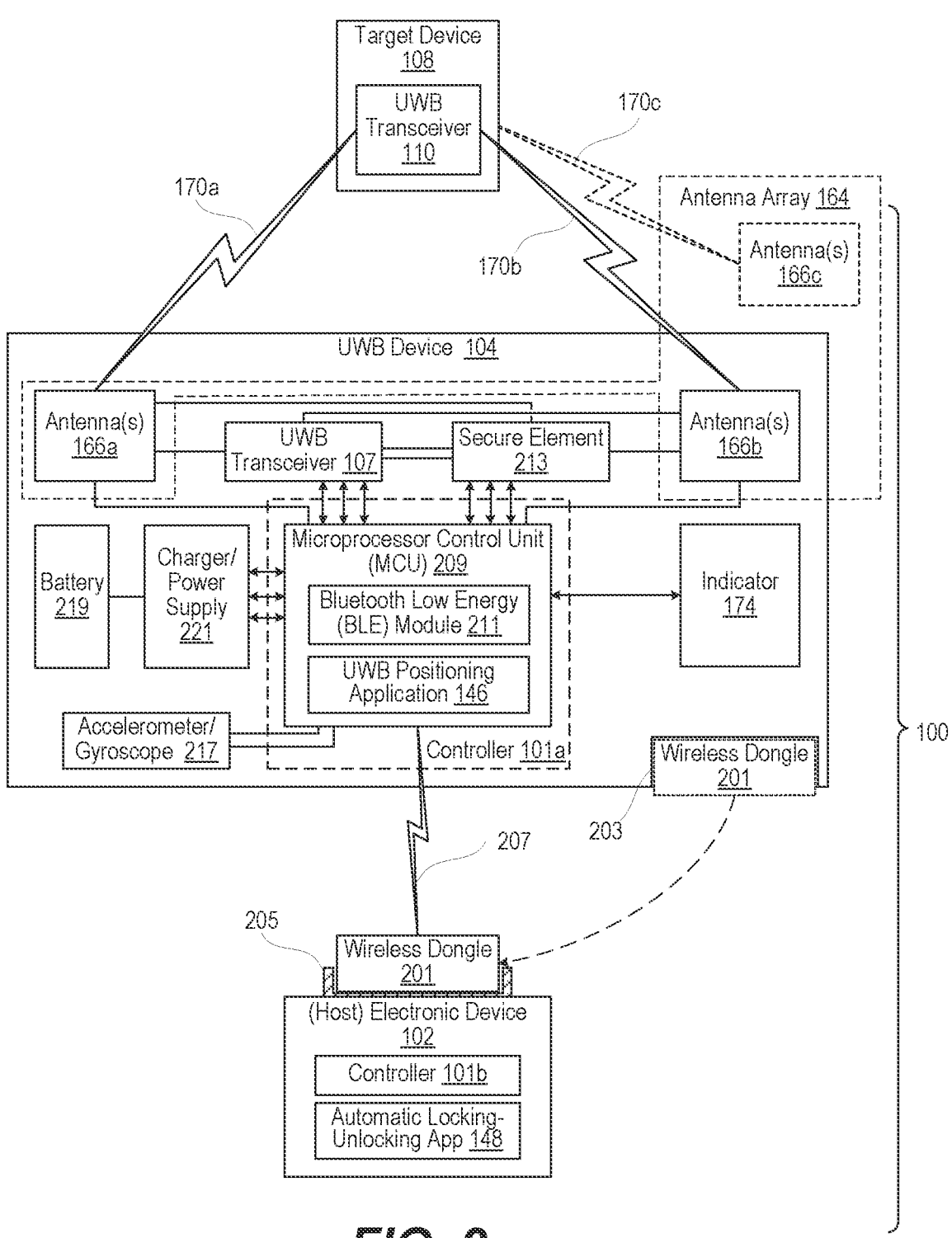
FIG. 2 is a diagram of an example electronic system having an electronic device augmented by a wirelessly connected UWB device, according to one or more embodiments.

FIG. 2 is a diagram of example electronic system 100 having electronic device 102 augmented by UWB device 104. UWB device 104 further includes a wireless dongle 201 that may be stowed in receptacle 203 prior to being inserted into a port, such as female universal serial bus (USB) port 205 of electronic device 102. UWB device 104 then is wirelessly communicatively coupled, such as via Bluetooth Low Energy (BLE) communication link 207 and wireless dongle 201, to electronic device 102. In an example, UWB device 104 includes controller 101*a* having microprocessor control unit (MCU) 209 that executes UWB positioning application 146. MCU 209 further includes BLE module 211 to communicatively connect to wireless dongle 201. Electronic device 102 includes controller 101*b* that executes automatic locking application that configures electronic device 102 to respond to UWB device 104.

In addition to UWB transceiver 107, controller 101*a* is communicatively coupled to secure element 213 that stores public-private encryption keys. Controller 101*a* is communicatively coupled to indicator 174 that is implemented as a red/green/blue (RGB) light emitting diode (LED) indicator light. Controller 101*a* is communicatively coupled to accelerometer/gyroscope 217 to be responsive to movements that may affect distance and direction determinations. Battery 219 and charger/power supply 221 power UWB device 104.

UWB device 104 may include at least a third antenna 166*c*, spaced apart from both first and second antennas 166*a*-166*b* of antenna assembly 164 to form a 3D antenna array. Third antenna 166*c* receives third UWB signal 170*c* that may be phase shifted from first and second UWB signals 170*a*-170*b* based on having a different TOF or TOA/TDOA due to a location of target device 108 relative to antenna assembly 164.

In one or more embodiments, electronic system 100 provides accurate relative position tracking. In one or more embodiments, electronic system 100 is an implementation of IEEE 802.15.4z-2020, which is the IEEE Standard for Low-Rate Wireless Networks—Amendment 1: Enhanced Ultra-Wideband (UWB) Physical Layers (PHYs) and Associated Ranging Techniques. UWB offers highly precise positioning, within 10 cm of ranging accuracy at as little as 3 degrees of precision through Time-of-Flight (ToF) and Angle-of-Arrival (AoA) measurements at up to 100 m through the use of Impulse Radio techniques in the 6-10 GHz frequency range. The IEEE 802.15.4 standard is an example of UWB positioning that is accurate and secure, versus other technologies. Aspects of the present disclosure may incorporate other UWB positioning methodologies.

Figure 3:
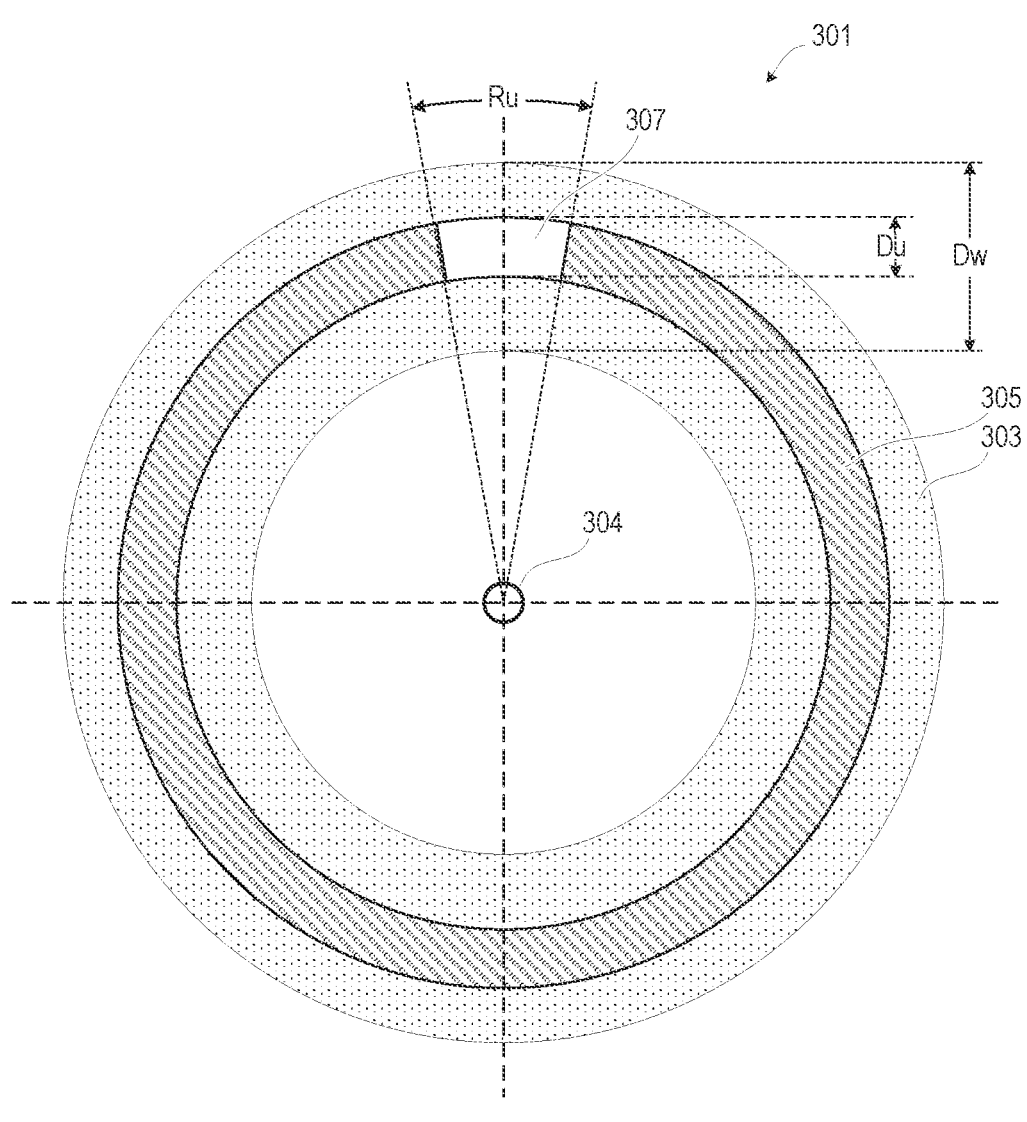
FIG. 3 is a graphical comparison of positioning sensing capabilities of UWB to other radio frequency (RF) wireless technologies, according to one or more embodiments.

FIG. 3 presents a graphical comparison 301 of positioning sensing capabilities of UWB to BLE and Wi-Fi technologies. Conventional RF technologies such as BLE and Wi-Fi wireless technologies resolve distance to a relatively large annular ring 303 around center 304 of width "Dw" with UWB capable of distance measurement in a narrow annular ring 305 of width "Du". With 2D or 3D measurements, UWB positioning locates a UWB target within an angular range 307 of radial angle "Ru".

The use of the scrambled timestamp sequence (STS), Cryptographically Secure Pseudo-Random Number Generation, and other features of the UWB PHY, makes UWB an extremely secure positioning technology. Using UWB positioning addresses deficiencies that may exist with using Received Signal Strength Indication (RSSI) for other radio frequency (RF) communication technologies. RSSI methods for determining proximity are less accurate due to deep fades or cross-body pathloss, which can be as much as 15-20 dB. The expected pathloss without such obstacles is a 6 dB reduction with each doubling of distance in free space. According to aspects of the present innovation, a UWB transceiver incorporates Impulse Response Ultra-wideband (IR-UWB) capabilities that use Time-of-Flight (TOF) or Time-of-Arrival/Time-Difference-of-Arrival (TOA/TDOA) for accurate distance measurement. The UWB transceiver does not suffer from the rapid changes in apparent distance with path loss swings since signal attenuation due to traveling through a lossy medium does not as measurably affect the time of arrival as long as the signal is above a receiver sensitivity threshold.

Figure 4:
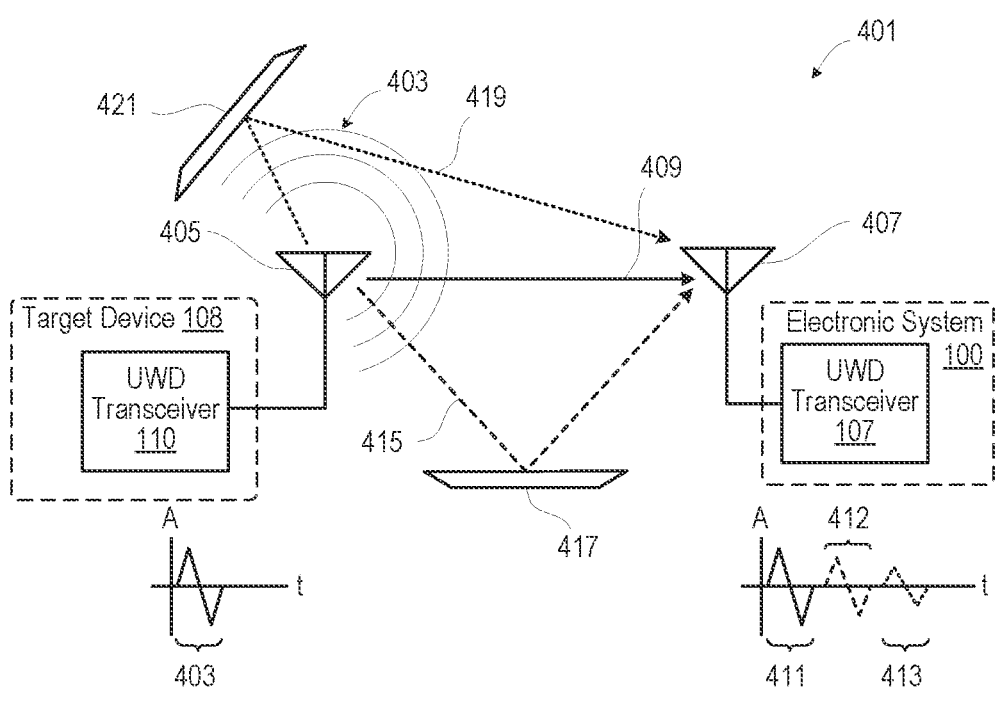
FIG. 4 is a diagram presenting Line of Sight (LoS) sensing using UWB transceivers, according to one or more embodiments.

Some of these capabilities may be demonstrated by comparing UWB positioning based on when a dominant signal is received that is Line of Sight (LoS) to when a dominant signal is received that is Non-Line of Sight (NLoS). FIG. 4 is a diagram 401 presenting LoS sensing based on a UWB signal 403 transmitted by UWB transceiver 110 of target device 108 from transmit antenna 405. In an example, UWB signal 403 is received at receiving antenna 407 of UWB transceiver 107 of electronic system 100 along three paths. A first path is direct path 409 that is the shortest, and thus, first received signal 411 is received first. Without electromagnetic property differences along direct path 409, first received signal 411 is expected to arrive with the greatest amplitude as compared to second and third received signals 412 and 413 that are multipath. In particular, second received signal 412 follows second path 415 having a distance longer than direct path 409 by reflecting off of forward surface 417. Based on attenuation due to propagation distance, second received signal 412 has a lower amplitude and is received subsequent to first received signal 411. Third received signal 413 follows third path 419 having a distance that is longer than both direct path 209 and second path 415 by reflecting back from aft surface 421. Based on attenuation due to propagation distance, third received signal 413 has a lowest amplitude and is received subsequent to both first and second received signals 411 and 412. Without a cause of pathloss other than caused by distance, distance may be determined based on the signal amplitude of the first, second, and third received signals 411-413, as in other conventional RF measurement techniques.

Figure 5:
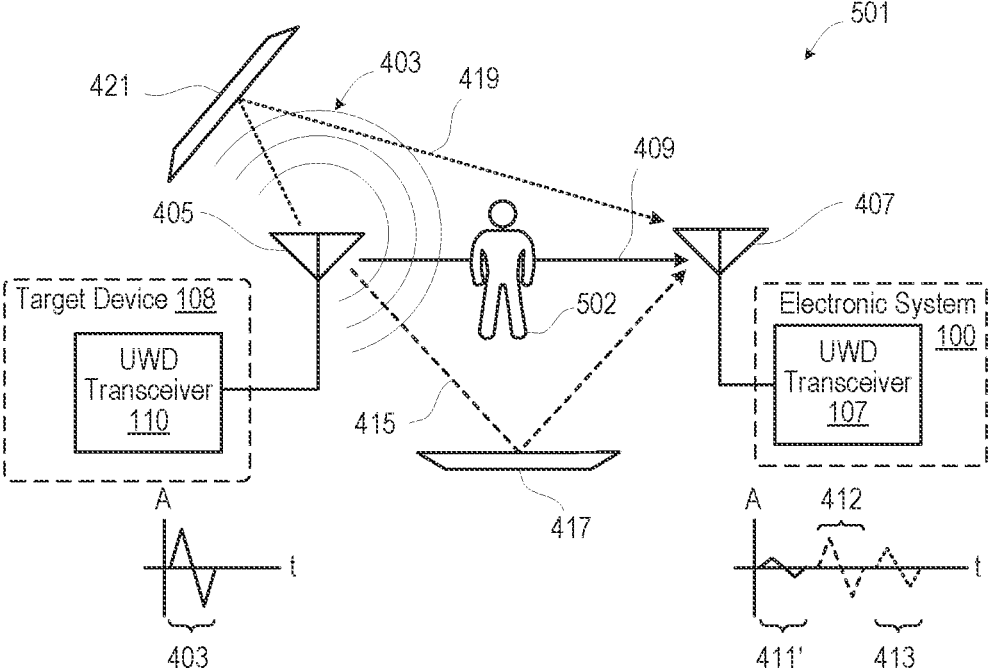
FIG. 5 is a diagram presenting Non-Line of Sight (NLoS) sensing using UWB transceivers, according to one or more embodiments.

FIG. 5 is a diagram 501 presenting NLoS sensing with a lossy obstacle, such as person 502, in a direct path between transmit antenna 405 of target device 108 and receive antenna 407 of electronic system 100. First received signal 411' is attenuated by person 502. Otherwise, diagram 501 is identical to diagram 401 (FIG. 4). Even with the attenuation, UWB transceiver 107 may still accurately provide positioning of target device 108 based on first arrival of first received signal 411' so long as the received amplitude is sufficient for receiver sensitivity of UWB transceiver 107. The advertising by UWB transceiver 107 for UWB signal 403 enables electronic system 100 to determine that first received signal 411' is received from direct path 409. The impulse characteristics and timing UWB signal 403 are prompted by electronic system 100.

Figures 6A, 6B:
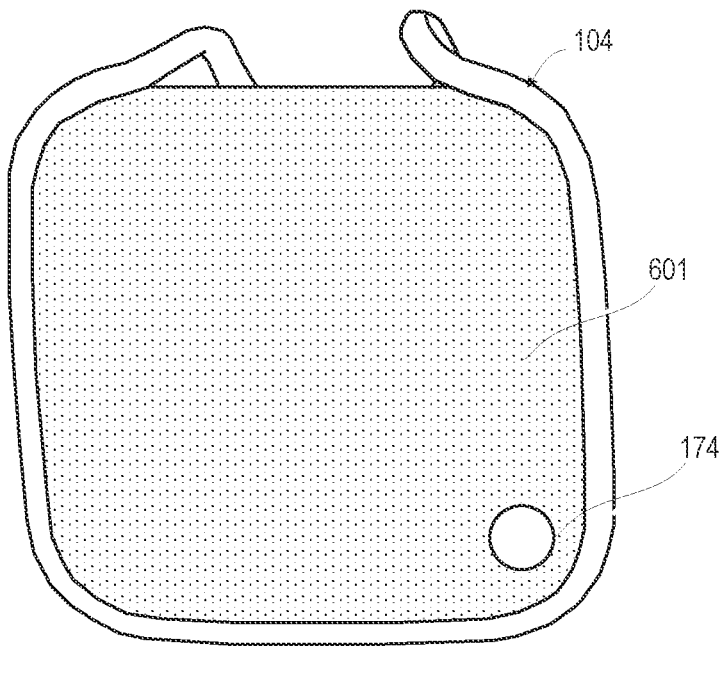
FIG. 6A is a front view of an example UWB accessory device with an indicator light, according to one or more embodiments.
FIG. 6B is a back view of the example UWB accessory device of FIG. 6A, having an attachment clip, according to one or more embodiments.

FIG. 6A is a front view of example UWB device 104 with indicator 174. A planar front surface 601 provides a visual indication of where unlock space 112 (FIG. 1) is expected to be in front of UWB device 104. FIG. 6B is a back view of example UWB device 104 having attachment clip mechanism 603 that is exteriorly presented to engage a lid of a laptop or top edge of a monitor to align unlock space 112

(FIG. 1) with a proximity to user interface device(s) 114 of electronic device 102 (FIG. 1).

Figure 7:
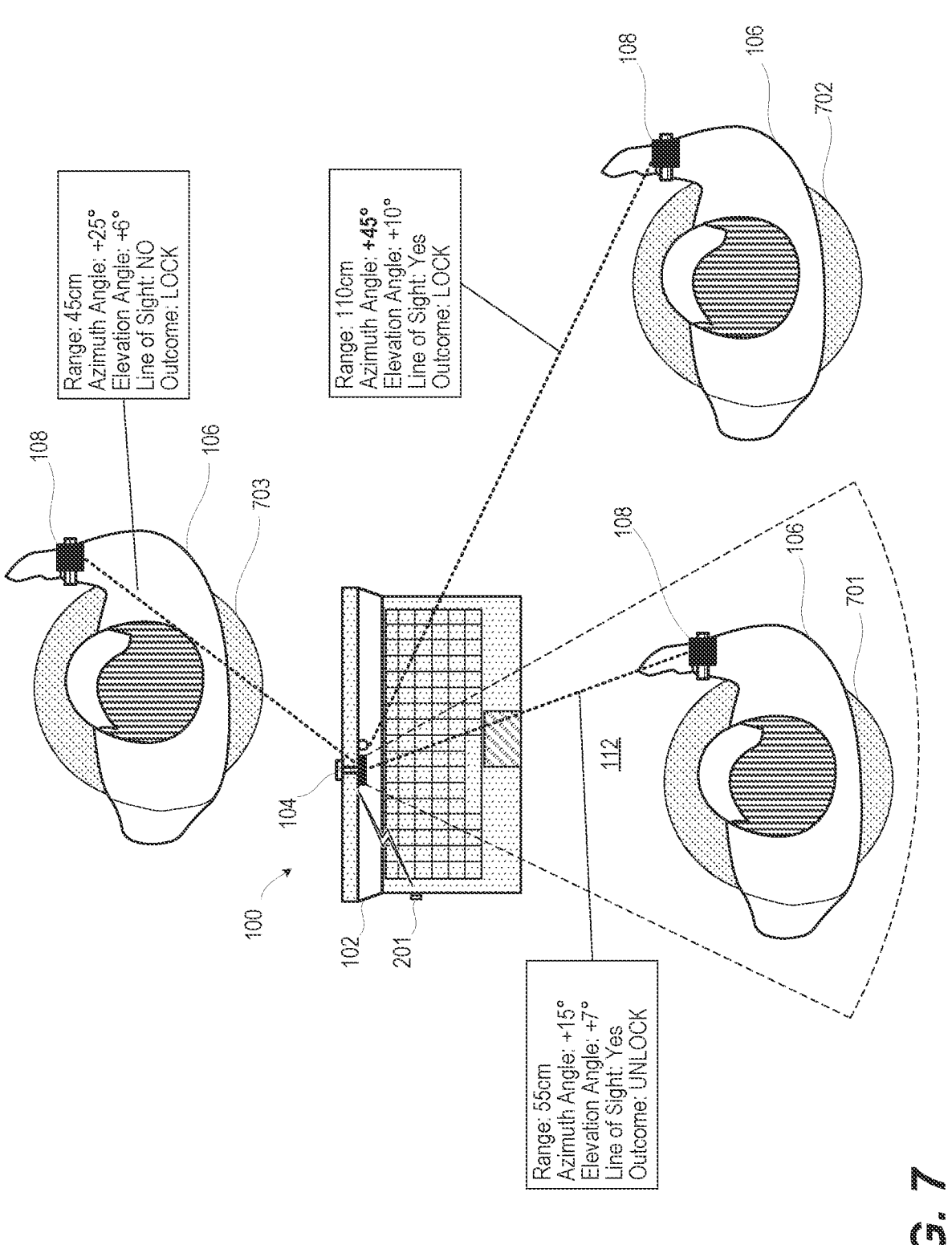
FIG. 7 is a top view of three scenarios using UWB accurate relative position tracking to identify when an authorized user is within an unlock space, according to one or more embodiments.

FIG. 7 is a top view of three scenarios using UWB accurate relative position tracking by UWB device 104 of target device 108 worn by authorized user 106, to identify when to unlock electronic device 102. In a first scenario, authorized user 106 is within unlock space 112 at first position 701. In an example, electronic system 100 determines that authorized user 106 is in unlock space 112 based on UWB positioning of target device 108 at range 55 cm, azimuth angle +15°, elevation angle +7°, within forward line of sight of UWB device 104. UWB device 104 may communicate via wireless dongle 201 to electronic device 102 to unlock user interface device(s) 114. In a second scenario, authorized user 106 moves out of unlock space 112 to second position 702. In an example, electronic system 100 determines that authorized user 106 is out of unlock space 112 based on UWB positioning of target device 108 at range 110 cm, azimuth angle +45°, elevation angle +10°, within forward line of sight of UWB device 104. The azimuth angle is outside of defined limits for unlock space 112. UWB device 104 may communicate via wireless dongle 201 to electronic device 102 to lock user interface device(s) 114. In a third scenario, authorized user 106 moves out of unlock space 112 to third position 703. In an example, electronic system 100 determines that authorized user 106 is out of unlock space 112 based on UWB positioning of target device 108 at range 45 cm, azimuth angle +25°, elevation angle +6° but not in the forward line of sight of UWB device 104. UWB device 104 may communicate via wireless dongle 201 to electronic device 102 to lock user interface device(s) 114. Conventional RF location techniques may be unable to distinguish front and back line of sight scenarios.

Figure 8:
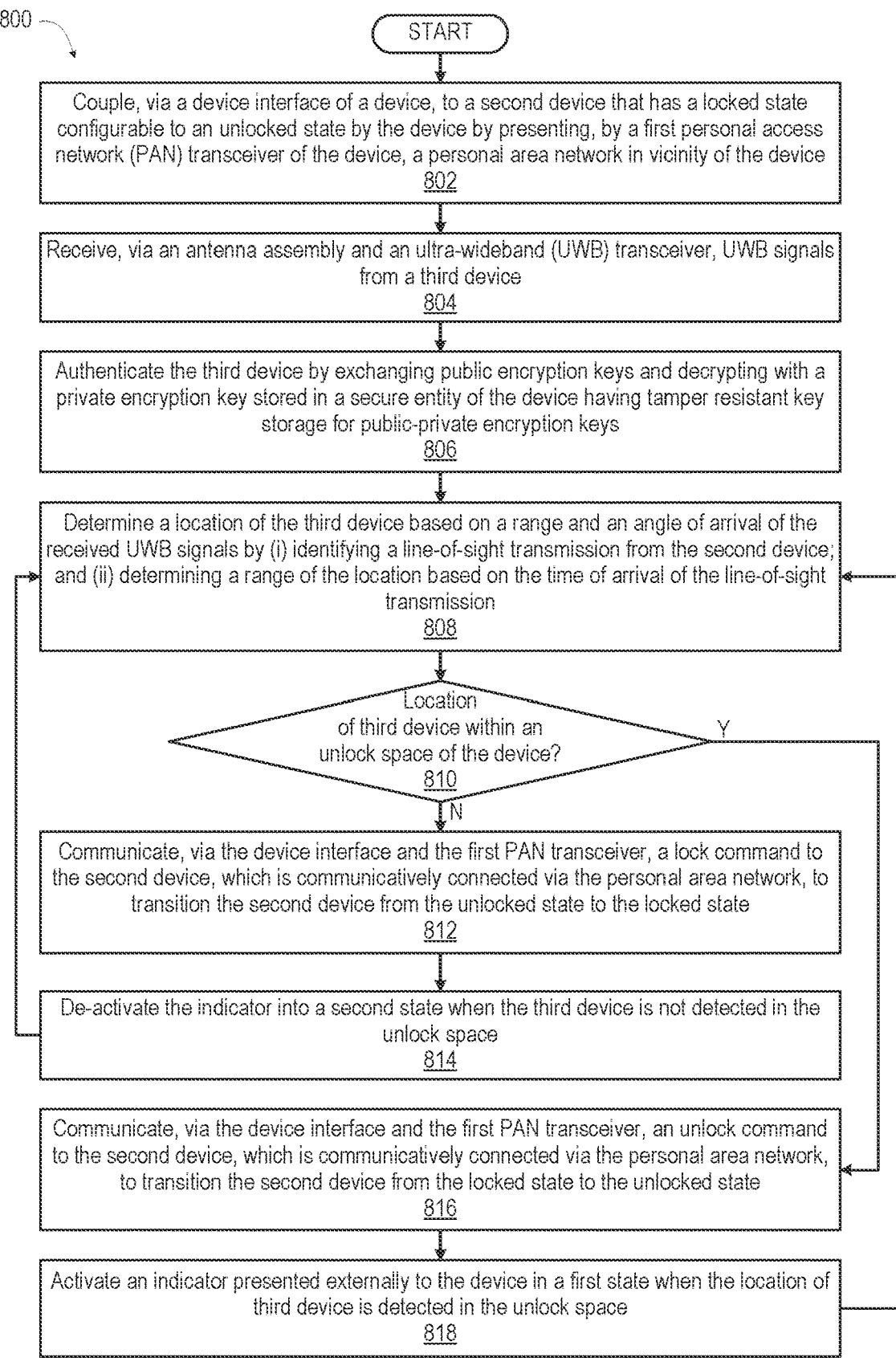
FIG. 8 is a flow diagram of a method for providing unlocking of an electronic device in response to accurately locating an authorized user who wears or carries an UWB-capable target device, according to one or more embodiments.

FIG. 8 is a flow diagram presenting method 800 for unlocking of a user interface in response to accurately locating an authorized user who wears or carries an ultra-wideband (UWB) capable target device. The description of method 800 is provided with general reference to the specific components illustrated within the preceding FIGS. 1-2, 6A-6B, and 7. Specific components referenced in method 800 may be identical or similar to components of the same name used in describing preceding FIGS. 1-2, 6A-6B, and 7. In one or more embodiments, controller 101 configures electronic system 100 (FIGS. 1-2, and 6) or electronic device 102 (FIGS. 6A-6B) to provide functionality of method 800.

With reference to FIG. 8, method 800 includes coupling, via a device interface of a device, to a second device that has a locked state configurable to an unlocked state by the device (block 802). According to one or more embodiments, the coupling includes presenting, by a first personal access network (PAN) transceiver of the device, a personal area network in a vicinity of the device. Method 800 includes receiving, via an antenna assembly and an ultra-wideband (UWB) transceiver, UWB signals from a third device (block 804). The antenna assembly includes two or more antennas spaced in a support structure as one of a two-dimensional (2D) or a three-dimensional (3D) antenna array. Method 800 includes authenticating the third device by exchanging public encryption keys and decrypting the public encryption keys with a private encryption key stored in a secure entity of the device (block 806). The secure entity has tamper resistant key storage for public-private encryption keys. Method 800 includes determining a location of the third device based on a range and an angle of arrival of the received UWB signals by (i) identifying a line-of-sight transmission from the second device; and (ii) determining a range of the location based on the time of arrival of the line-of-sight transmission (block 808). Method 800 includes determining whether the location is within an unlock space of the device (decision block 810). In one or more embodiments, the unlock space is a two dimensional or three-dimensional space defined relative to a position of the device. In response to determining that the location is not within the unlock space of the device, method 800 includes communicating, via the device interface and the first PAN transceiver, a lock command to the second device, which is communicatively connected via the personal area network, to transition the second device from the unlocked state to the locked state if not already locked (block 812). Method 800 includes de-activating the indicator into a second state, which indicates that the third device is not detected in the unlock space (block 814). The indicator visually identifies whether the location of the third device is within the unlock space. Then method 800 returns to block 808.

In response to determining that the third device is within the unlock space of the device in decision block 810, method 800 includes communicating, via the device interface and the first PAN transceiver, an unlock command to the second device, which is communicatively connected via the personal area network, to transition the second device from the locked state to the unlocked state (block 816). Method 800 includes activating an indicator presented externally to the device in a first state when the location of third device is detected in the unlock space (block 818). Then method 800 returns to block 808.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An accessory device comprising:
an antenna assembly comprising two or more antennas spaced in a support structure as one of a two-dimensional (2D) or a three-dimensional (3D) antenna array;
an accessory housing supporting the antenna assembly;
an ultra-wideband (UWB) transceiver communicatively coupled to the antenna assembly;
a device interface comprising a wireless personal area network (PAN) transceiver by which the accessory device communicatively couples to a second device that has a locked state and that is configurable to an unlocked state by the accessory device;
a controller communicatively coupled to the antenna assembly, the UWB transceiver and the device interface, and which configures the accessory device to:
receive, via the UWB transceiver, UWB signals from a third device;
determine a location of the third device based on a range and an angle of arrival of the received UWB signals; and
in response to determining that the location is within an unlock space of the second device, communicate, via the device interface, an unlock command to the second device to transition the second device from the locked state to the unlocked state.

2. The accessory device of claim 1, wherein the controller is configured to cause the accessory device to:
determine that a location of the third device has moved from within the unlock space to outside of the unlock space; and
communicate, via the device interface, a lock command to the second device, in response to determining that the location of the third device has moved from within the unlock space to outside of the unlock space.

3. The accessory device of claim 1, further comprising an indicator that is communicatively coupled to the controller and presented externally to the accessory device, the controller activating the indicator in a first state when the location of the third device is detected in the unlock space and de-activating the indicator into a second state when the third device is not detected in the unlock space, the indicator visually identifying the location of the third device relative to the unlock space.

4. The accessory device of claim 1, further comprising a secure entity having tamper resistant key storage for public-private encryption keys and being communicatively coupled to the controller, wherein the controller is configured to cause the accessory device to communicate the unlock command further in response to the controller authenticating the third device, wherein the authenticating includes decrypting, with a private encryption key, public encryption keys exchanged by the third device, wherein the private encryption key is stored in the secure entity.

5. The accessory device of claim 1, wherein:
the PAN transceiver is communicatively connected to the controller, and is configured to present a personal area network by which the second device communicatively connects to the accessory device; and
the controller is configured to cause the device to communicate the unlock command via the wireless PAN transceiver to the second device, which is communicatively connected to the accessory device via the personal area network.

6. The accessory device of claim 1, wherein the controller is configured to cause the accessory device to:
identify a line-of-sight transmission from the second device; and
determine a range of the location based on time of arrival of the line-of-sight transmission.

7. The accessory device of claim 1, further comprising:
a clip mechanism on an exterior of the accessory housing, wherein the clip mechanism attaches the accessory device to the second device;
wherein the clip mechanism is configured to engage the second device to position the unlock space relative to a user interface of the second device.

8. A method comprising:
coupling, via a device interface comprising a wireless personal area network (PAN) transceiver of an accessory device, to a second device that has a locked state and that is configurable to an unlocked state by the accessory device, the accessory device including an accessory housing;
receiving, via an antenna assembly supported by the accessory housing and an ultra-wideband (UWB) transceiver of the accessory device, UWB signals from a third device, the antenna assembly comprising two or more antennas spaced in a support structure as one of a two-dimensional (2D) or a three-dimensional (3D) antenna array;
determining a location of the third device based on a range and an angle of arrival of the received UWB signals; and
in response to determining that the location is within an unlock space of the second device, communicating, via the device interface from the accessory device, an unlock command to the second device to transition the second device from the locked state to the unlocked state.

9. The method of claim 8, further comprising:
determining that a location of the third device has moved from within the unlock space to outside of the unlock space; and

communicating, via the device interface, a lock command
to the second device, in response to determining that
the location of the third device has moved from within
the unlock space to outside of the unlock space.

10. The method of claim 8, further comprising activating
an indicator presented externally to the accessory device in
a first state when the location of the third device is detected
in the unlock space and de-activating the indicator into a
second state when the third device is not detected in the
unlock space, the indicator visually indicating whether the
location of the third device is in the unlock space.

11. The method of claim 8, further comprising commu-
nicating the unlock command further in response to authen-
ticating the third device, wherein the authenticating includes
decrypting, with a private encryption key, public encryption
keys exchanged by the third device, wherein the private
encryption key is stored in a secure entity of the accessory
device having tamper resistant key storage for public-private
encryption keys.

12. The method of claim 8, further comprising:
presenting, by the wireless PAN transceiver of the acces-
sory device, a personal area network by which the
second device communicatively connects to the acces-
sory device; and
communicating the unlock command via the wireless
PAN transceiver to the second device, which is com-
municatively connected via the personal area network
to the accessory device.

13. The method of claim 8, further comprising:
identifying a line-of-sight transmission from the second
device; and
determining a range of the location based on time of
arrival of the line-of-sight transmission.

14. The method of claim 8, wherein the accessory device
comprises a clip mechanism on the accessory housing
configured to attach the accessory device to the second
device, wherein the clip mechanism is configured to engage
the second device to position the unlock space relative to a
user interface of the second device.

15. A computer program product comprising:
a non-transitory computer readable storage device; and
program code on the computer readable storage device
that when executed by a processor associated with an
accessory device, the program code enables the acces-
sory device to provide functionality of:
coupling, via a device interface comprising a wireless
personal area network (PAN) transceiver of the
accessory device, to a second device that has a
locked state and that is configurable to an unlocked
state by the accessory device, the accessory device
including an accessory housing and a clip mecha-
nism on the accessory housing configured to attach
the accessory device to the second device;
receiving, via an antenna assembly supported by the
accessory housing and an ultra-wideband (UWB)
transceiver of the accessory device, UWB signals
from a third device, the antenna assembly compris-
ing two or more antennas spaced in a support structure as one of a two-dimensional (2D) or a three-
dimensional (3D) antenna array;
determining a location of the third device based on a
range and an angle of arrival of the received UWB
signals; and
in response to determining that the location is within an
unlock space of the second device, communicating,
via the device interface of the accessory device, an
unlock command to the second device to transition
the second device from the locked state to the
unlocked state.

16. The computer program product of claim 15, wherein
the program code enables the accessory device to provide
functionality of:
determining that a location of the third device has moved
from within the unlock space to outside of the unlock
space; and
communicating, via the device interface, a lock command
to the second device, in response to determining that
the location of the third device has moved from within
the unlock space to outside of the unlock space.

17. The computer program product of claim 15, wherein
the program code enables the accessory device to provide
functionality of activating an indicator presented externally
to the accessory device in a first state when the location of
the third device is detected in the unlock space and de-
activating the indicator into a second state when the third
device is not detected in the unlock space, the indicator
visually indicating whether the location of the third device
is in the unlock space.

18. The computer program product of claim 15, wherein
the program code enables the accessory device to provide
functionality of communicating the unlock command further
in response to authenticating the third device, wherein the
authenticating includes decrypting, with a private encryption
key, public encryption keys exchanged by the third device,
wherein the private encryption key is stored in a secure
entity of the accessory device having tamper resistant key
storage for public-private encryption keys.

19. The computer program product of claim 15, wherein
the program code enables the accessory device to provide
functionality of:
presenting, by the wireless PAN transceiver of the acces-
sory device, a personal area network by which the
second device communicatively connects to the acces-
sory device; and
communicating the unlock command via the wireless
PAN transceiver to the second device, which is com-
municatively connected via the personal area network
to the accessory device.

20. The computer program product of claim 15, wherein
the program code enables the accessory device to provide
functionality of:
identifying a line-of-sight transmission from the second
device; and
determining a range of the location based on time of
arrival of the line-of-sight transmission.

* * * * *